Patented Sept. 2, 1947

2,426,829

UNITED STATES PATENT OFFICE 2,426,829

PRODUCTION OF OLEFINS

Kenneth K. Kearby, Elizabeth, N. J., assignor to Standard Oil Development Company, a corporation of Delaware No Drawing. Application September 26, 1942, Serial No. 459,835

19 Claims. (Cl. 260—669)

The present invention relates to improvements in the art of producing olefins by dehydrogenation and, more particularly, it relates to improvements in the method of producing by dehydrogenation, olefinic hydrocarbons such as butadiene and styrene from the corresponding more saturated starting material.

A great deal of research has been directed recently toward the production of olefins and diolefins, since these substances have been found to be valuable intermediates in the production of rubber substitutes. Thus a satisfactory rubber substitute may be produced by copolymerizing butadiene and styrene or copolymerizing butadiene and isobutylene. The products obtained by this polymerization possess many of the properties of natural rubber. Also styrene and some of the other olefinic hydrocarbons undergo polymerization to form resinous products which are suitable for manufacturing numerous articles of commerce by casting, compressing, molding, and the like.

My present invention is directed primarily to the catalytic dehydrogenation of ethylbenzene to form styrene, and the dehydrogenation of butenes to form butadiene, and in its essence it involves the use of a new catalyst for the dehydrogenation reaction. The catalyst is one which contains a high percentage of iron oxide, and I have found as a result of numerous tests that this catalyst is effective to produce high yields of butadiene from butenes with a high degree of selectivity. It will be understood that by selectivity I refer to the fact that butadiene tends to undergo thermal degradation with a consequent loss in ultimate yield, and by high selectivity I mean that the percentage of butadiene finally recovered from the process is high with respect to the amount of feed converted.

The main object of the present invention therefore is to improve the catalytic dehydrogenation of hydrocarbons to form olefins and thus insure high ultimate yields.

A more specific object of my present invention is to provide a catalyst suitable for the dehydrogenation of hydrocarbons such as butenes, which catalyst is active, does not cause excessive formation of coke and other degradation products, is stable toward steam, and is otherwise satisfactory and inexpensive for the purposes intended.

Other and further objects of the present invention will appear from the following more detailed description and claims.

In order to show the utility of my improved catalyst suitable for the dehydrogenation of butenes, I set forth below some of the runs which I have made in order to test the effectiveness of the catalyst from the standpoint of conversion and selectivity particularly, but also from the standpoint of coke formation and formation of carbon monoxide and carbon dioxide. The composition of the catalyst in the several runs is set forth below. In these runs butene was dehydrogenated in the presence of catalyst of the composition indicated under the following conditions:

Temperature, 1200° F.
Feed Rate, 800 volumes of butene per volume of catalyst per hour, the gas containing 7 volumes of steam per volume of butene.

| Run No. | 1 | 2 | 3 | 4 | 5 | 6 | 7 | 8 |
|---|---|---|---|---|---|---|---|---|
| Catalyst Composition | 100% $Fe_2O_3$ | 98% $Fe_2O_3$, 2% $K_2O$ | 93% $Fe_2O_3$, 5% CuO, 2% $K_2O$ | 93% $Fe_2O_3$, 5% MgO, 2% $K_2O$ | 93% $Fe_2O_3$, 5% $Cr_2O_3$, 2% $K_2O$ | 91% $Fe_2O_3$, 2% $Al_2O_3$, 5% CuO, 2% $K_2O$ | 96% $Fe_2O_3$, 2% $Al_2O_3$, 2% $K_2O$ | 78.5% $Fe_2O_3$, 20% $Al_2O_3$, 5% CuO, 1.5% $K_2O$ |
| Percent Conversion | 14 | 32 | 32 | 19 | 32 | 39 | 34 | 50.6 |
| Percent Selectivity | 52 | 61 | 58 | 72 | 61 | 60 | 65 | 56 |
| Percent Butadiene | 7.2 | 19 | 18 | 14 | 20 | 24 | 22 | 28.3 |
| Est. Selectivity at 25% Conversion | | | | | | | | 78 |
| Percent Coke | 0.03 | 0.12 | 0.2 | 0.11 | 0.14 | 0.11 | 0.09 | 0.11 |
| Percent $CO+CO_2$ | 5.2 | 3.4 | 4.1 | 1.4 | 4.3 | 5.4 | 3.8 | 6.9 |

It is obvious from the foregoing data that $K_2O$ which is a promoter is an essential ingredient of this type of catalyst. The inclusion of copper oxide and chromium oxide had very little effect, whereas 5% of magnesia appeared harmful. With respect, however, to the copper oxide and the chromium oxide, it should be stated that these substances were added to stabilize the mixture, i. e., to prevent loss of $K_2O$, and for that reason it is desirable to include them in the composition.

In preparing catalyst composition, the following procedures were used. First, the catalyst used in run 8 was prepared as follows:

Example 1

1012 grams of ferric nitrate and 451 grams aluminum nitrate dissolved in 8 liters H₂O were neutralized with a solution of 1 liter concentrated NH₄OH (28% by weight) in 2 liters H₂O. The precipitate was filtered, thoroughly washed and mixed with a solution of 38.7 grams copper nitrate and 8.2 grams potassium nitrate in 200 cc. H₂O. The slurry was dried, heated 3 hours at 1000° F., cooled and pilled.

Example 2

The catalyst used in run 2 was prepared as follows: Ferric hydroxide was precipitated from 506 grams of ferric nitrate in 4 liters H₂O with 500 cc. NH₄OH (28% by weight) in 1.5 liters H₂O. The precipitate was thoroughly washed, mixed with a solution of 4.5 grams KNO₃ in 50 cc. H₂O, dried and heated 3 hours at 1000° F., cooled and pilled.

Example 3

The catalyst used in run 1 was prepared as follows: Ferric hydroxide was precipitated from 506 grams of ferric nitrate in 4 liters H₂O with 500 cc. NH₄OH (28% by weight) in 1.5 liters H₂O. The precipitate was thoroughly washed, dried and heated three hours at 1000° F., cooled and pilled.

Example 4

The catalyst of run 5 was prepared as follows: Ferric hydroxide and chromium oxide were precipitated from a solution containing 506 grams of ferric nitrate and 28.3 grams chromium nitrate in 4 liters of water with 350 cc. of concentrated NH₄OH (28% by weight). The precipitate was thoroughly washed, mixed with a solution of 4.6 grams of KNO₃ and 50 cc. of H₂O, dried and heated three hours at 1000° F., cooled and pilled.

Example 5

The catalyst in run 6 was prepared as follows: Ferric hydroxide and alumina were precipitated from a solution containing 506 grams of ferric nitrate and 16.2 grams of aluminum nitrate in 4 liters H₂O with 350 cc. concentrated NH₄OH (28% by weight). The precipitate was thoroughly washed, mixed with a solution of 16.7 grams copper nitrate and 4.7 grams potassium nitrate in 50 cc. of water, dried and heated three hours at 1000° F., cooled and pilled.

Example 6

The catalyst prepared in run 7 was made as follows: A solution of 506 grams ferric nitrate and 15.3 grams aluminum nitrate in 2500 cc. H₂O was neutralized with 350 cc. NH₄OH (28% by weight), filtered, washed thoroughly, mixed with a solution of 4.5 grams KNO₃ in 100 cc. H₂O, dried and heated three hours at 1000° F., cooled and pilled.

Example 7

The catalyst prepared in run 4 was made as follows: 5.4 grams MgO dissolved in dilute nitric acid and added to a solution of 506 grams ferric nitrate in 2.5 liters H₂O. A solution of 300 grams KOH in 800 cc. H₂O was added. The precipitate was filtered, washed thoroughly, and mixed with a solution of 4.6 grams KNO₃ in 100 cc. H₂O, dried and heated three hours at 1000° F., cooled and pilled.

Example 8

The catalyst in run 3 was prepared as follows: A solution of 506 grams ferric nitrate and 16.4 grams copper nitrate in 2.5 liters H₂O was mixed with a solution of 300 grams KOH in 1500 cc. H₂O. The precipitate was filtered, thoroughly washed, and mixed with a solution of 4.6 grams KNO₃ in 100 cc. H₂O. The slurry was dried and heated three hours at 1000° F., cooled and pilled.

My researches have indicated that I may use for the dehydrogenation of butene a catalyst containing from 50–99.5 weight per cent of iron oxide, but they have also shown that the catalyst should be promoted with at least .5% by weight of potassium oxide. The potassium oxide may be increased, however, up to 10% or more. Of course, other promoters such as sodium hydroxide, calcium oxide, or the oxides, generally, of the alkali and alkaline earths may be used, but best results are secured from potassium oxide. In addition to the iron oxide and the promoter, I may also include from 1–50% of other oxides, and preferably from 1–20% of addition agents such as aluminum oxide, copper oxide, magnesium oxide, zirconium oxide, zinc oxide and possibly silica. of the above named oxides, I prefer to use aluminum oxide, copper oxide and zinc oxide. Therefore, to sum up, I may use a two-component catalyst consisting only of iron oxide and, say, a promoter such as potassium oxide, but for the purposes of stability I prefer to include copper oxide, zinc oxide or aluminum oxide.

As previously indicated, my improved process relates to the dehydrogenation of ethylbenzene or other alkylated benzenes to form phenyl alkenes unsaturated in the side chain. My improved catalysts are not effective to dehydrogenate paraffins, but strange to say they are effective to dehydrogenate aromatics which are substituted with an alkyl radical such as ethyl, propyl, butyl, and the like, and therefore the catalysts are effective to dehydrogenate a mono-olefin to a diolefin and an aromatic having a paraffinic substituent to an olefinic aromatic hydrocarbon where, of course, the paraffinic side chain has at least two carbon atoms in a given chain.

Numerous modifications of my invention not specifically mentioned herein but disclosed by necessary implication will readily suggest themselves to those who are familiar with the dehydrogenation art and the catalyst which is suitable therefor.

What I claim is:

1. The method of dehydrogenating a hydrocarbon of the class consisting of mono-olefins and alkylated aromatics which comprises contacting said hydrocarbon with a catalyst consisting predominantly of iron oxide promoted with a minor amount of alkali metal oxide selected from the class consisting of potassium oxide and sodium oxide.

2. The method set forth in claim 1 in which the catalyst contains from 50–99.5% iron oxide.

3. The method set forth in claim 1 in which the catalyst contains a preponderance of iron oxide, a minor quantity of potassium oxide, and a stabilizer.

4. The method of dehydrogenating a hydrocarbon of the class consisting of mono-olefins and alkylated aromatics which comprises contacting said hydrocarbon with a catalyst containing a preponderance of ferric oxide, a minor amount of a promoter selected from the class consisting of alkali metal oxides and alkaline earth metal oxides, and at least one stabilizer selected from the class consisting of aluminum oxide, copper oxide and zinc oxide.

5. The method set forth in claim 4 in which the catalyst consists of 78.5 parts by weight of $Fe_2O_3$, 20 parts by weight $Al_2O_3$, 5 parts by weight CuO, and 1.5 parts by weight $K_2O$.

6. The method set forth in claim 4 in which the catalyst consists in 78.5 parts by weight of $Fe_2O_3$, 20 parts by weight of $Al_2O_3$, 5 parts by weight of CuO, and 1.5 parts by weight of $K_2O$, and in which the dehydrogenation operation of the hydrocarbon was carried out in the presence of from 1 to 20 volumes of steam per volume of hydrocarbon.

7. The method set forth in claim 4, in which the dehydrogenation is carried out in the presence of added steam, the amount of said steam being from 1 to 20 volumes of steam per volume of hydrocarbon.

8. The method set forth in claim 4 in which the alkali metal oxide is $K_2O$ present in amounts between about 0.5 and 20% by weight of the total catalyst composition.

9. The method set forth in claim 4 in which the catalyst contains a preponderance of ferric oxide, a minor amount of an oxide selected from the class consisting of alkali metal oxide and alkaline earth oxide, and from 2 to 20 weight percent of a stabilizer selected from the class consisting of aluminum oxide, copper oxide and zinc oxide.

10. The method of dehydrogenating a hydrocarbon of the class consisting of mono-olefins and alkylated aromatics containing a plurality of carbon atoms in the alkyl group which comprises contacting said hydrocarbon at a temperature within the range of from 1050 to 1300° F., admixed with from 1-20 volumes of steam per volume of hydrocarbon with a catalyst containing a preponderance of ferric oxide, and a minor amount of oxide selected from the class consisting of potassium oxide and sodium oxide.

11. The method set forth in claim 10 in which the catalyst consists of a major portion of iron oxide and a minor proportion of $K_2O$.

12. The method set forth in claim 10 in which the catalyst contains over 90% ferric oxide, a small amount of $K_2O$, and a small amount of CuO.

13. The method of dehydrogenating a hydrocarbon of the class consisting of mono-olefins and alkylated aromatics containing a plurality of carbon atoms in the alkyl group which comprises contacting said hydrocarbon at elevated temperatures admixed with steam with a catalyst containing a preponderance of ferric oxide, and also containing chromium oxide and an alkali metal oxide.

14. The method set forth in claim 13 in which the alkali metal oxide is potassium oxide.

15. The method set forth in claim 13 in which the catalyst composition is substantially as follows in parts by weight: 93% $Fe_2O_3$, 5% $Cr_2O_3$, 2% $K_2O$.

16. In the dehydrogenation of butenes, the improvement which comprises contacting a mixture of said butenes and steam with a catalyst consisting predominantly of iron oxide, containing a minor amount of chromium oxide, and a small amount of potassium oxide.

17. The method set forth in claim 16 in which the butene is admixed with 1–20 volumes of steam and the temperature of the mixture is from about 1050–1300° F. during the time the mixture is in contact with the catalyst.

18. The method of dehydrogenating a mono-olefin which comprises contacting said mono-olefin in the presence of steam with a catalyst containing a preponderance of iron oxide, a minor amount of a promoter selected from the class consisting of alkali metal oxides, and aluminum oxide as a stabilizer.

19. In the dehydrogenation of ethyl benzene, the improvement which comprises contacting a mixture of said ethyl benzene and steam with a catalyst consisting predominantly of iron oxide, containing a minor amount of chromium oxide and a small amount of potassium oxide.

KENNETH K. KEARBY.

REFERENCES CITED

The following references are of record in the file of this patent:

UNITED STATES PATENTS

| Number | Name | Date |
|---|---|---|
| 1,985,844 | Suida | Dec. 23, 1934 |
| 1,986,241 | Wulff et al. | Jan. 1, 1935 |
| 2,035,189 | Ramage | Mar. 24, 1936 |